US011629655B2

(12) United States Patent
Kokubu et al.

(10) Patent No.: US 11,629,655 B2
(45) Date of Patent: Apr. 18, 2023

(54) ENGINE SYSTEM

(71) Applicant: Mazda Motor Corporation, Hiroshima (JP)

(72) Inventors: Hironori Kokubu, Aki-gun (JP); Kenji Sasaki, Aki-gun (JP); Atsushi Yagi, Aki-gun (JP); Tomokuni Kusunoki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 30 days.

(21) Appl. No.: 17/454,099

(22) Filed: Nov. 9, 2021

(65) Prior Publication Data

US 2022/0195950 A1  Jun. 23, 2022

(30) Foreign Application Priority Data

Dec. 22, 2020 (JP) .............................. JP2020-212318

(51) Int. Cl.
*F02D 23/00* (2006.01)
*F02P 9/00* (2006.01)
(Continued)

(52) U.S. Cl.
CPC ............ *F02D 23/005* (2013.01); *F02B 39/12* (2013.01); *F02D 41/0007* (2013.01);
(Continued)

(58) Field of Classification Search
CPC ....... F02D 2200/1002; F02D 2200/101; F02D 2200/602; F02D 2250/12; F02D 23/005;
(Continued)

(56) References Cited

U.S. PATENT DOCUMENTS 4,556,038 A * 12/1985 Okamoto ................ F02B 39/12
60/602
4,656,992 A * 4/1987 Oonaka ................. F02D 23/005
123/559.3
(Continued)

FOREIGN PATENT DOCUMENTS

JP         S601324 A    *  1/1985
JP       61175236 A    *  8/1986
(Continued)

*Primary Examiner* — John M Zaleskas
(74) *Attorney, Agent, or Firm* — Alleman Hall Creasman & Tuttle LLP (57) ABSTRACT

An engine system provided to a vehicle having an accelerator pedal is provided. When an engine operation range is determined to shift to a first range (where an electromagnetic clutch is disengaged) from a second range (where the clutch is engaged) after an opening of the accelerator pedal increases at a rate below a given reference rate, the clutch is switched from ON to OFF after a given basic stand-by period passes from the shift. When the engine operation range is determined to shift from the second range to the first range after the accelerator pedal opening increases at the given reference rate or above, the clutch is switched from ON to OFF after a given acceleration stand-by period (longer than the basic stand-by period by a given added period) passes from the shift.

20 Claims, 7 Drawing Sheets

(51) Int. Cl.
  *F16D 48/06* (2006.01)
  *F02B 39/12* (2006.01)
  *F02D 41/10* (2006.01)
  *F02D 41/30* (2006.01)
  *F02D 41/00* (2006.01)

(52) U.S. Cl.
  CPC ......... *F02D 41/10* (2013.01); *F02D 41/3041* (2013.01); *F02P 9/002* (2013.01); *F02D 2200/101* (2013.01); *F02D 2200/1002* (2013.01); *F02D 2200/602* (2013.01); *F02D 2250/12* (2013.01); *F16D 2500/1068* (2013.01); *F16D 2500/1107* (2013.01); *F16D 2500/3065* (2013.01); *F16D 2500/3067* (2013.01); *F16D 2500/3144* (2013.01)

(58) Field of Classification Search
  CPC .... F02D 41/0007; F02D 41/10; F02D 41/107; F02D 41/3041; F16D 2500/1068; F16D 2500/3065; F16D 2500/3067; F16D 2500/3144; F16D 2500/31446; F16D 2500/31453; F02B 39/12
  See application file for complete search history.

(56) References Cited

U.S. PATENT DOCUMENTS

| | | | | | |
|---|---|---|---|---|---|
| 4,708,119 | A | * | 11/1987 | Miyake | F02D 41/0007 123/559.3 |
| 4,766,873 | A | * | 8/1988 | Miyagi | F02B 33/446 123/559.3 |
| 4,800,863 | A | * | 1/1989 | Miyagi | F02B 39/12 123/559.3 |
| 5,022,375 | A | * | 6/1991 | Goto | F02B 39/12 123/564 |
| 5,133,326 | A | * | 7/1992 | Nishimura | F16D 48/064 123/559.3 |
| 5,150,693 | A | * | 9/1992 | Ohnaka | F02B 39/16 123/559.3 |
| 5,564,400 | A | * | 10/1996 | Nishimura | F16H 61/0213 123/559.3 |
| 6,289,882 | B1 | * | 9/2001 | Slicker | F02B 33/38 123/559.3 |
| 2003/0079727 | A1 | * | 5/2003 | Stretch | F16D 37/02 123/559.3 |
| 2013/0090832 | A1 | * | 4/2013 | Bevan | F02D 23/005 417/213 |
| 2018/0171893 | A1 | * | 6/2018 | Bevan | F02B 37/04 |

FOREIGN PATENT DOCUMENTS

| | | | |
|---|---|---|---|
| JP | 62007930 A | * | 1/1987 |
| JP | 62007931 A | * | 1/1987 |
| JP | S62186013 A | * | 8/1987 |
| JP | 10061451 A | * | 3/1998 |
| JP | H11132046 A | * | 5/1999 |
| JP | H11210482 A | * | 8/1999 |
| JP | 2018031350 A | * | 3/2018 |
| JP | 2019039393 A | | 3/2019 |

* cited by examiner

ENGINE SYSTEM

TECHNICAL FIELD

The present disclosure relates to an engine system provided to a vehicle having an accelerator pedal.

BACKGROUND OF THE DISCLOSURE

Conventionally, technologies for an engine system mounted on an automobile are known, in which when an engine operates within, for example, a high-load range or a high-speed range, a booster boosts air to a combustion chamber of the engine in order to increase engine torque. Particularly, a mechanical supercharger (i.e., a supercharger) which performs boosting by using a rotary-drive force from an output shaft (e.g., a crankshaft) of the engine excels in response compared with an exhaust-turbine supercharger (i.e., a turbocharger) which uses exhaust pressure of the engine.

An engine system disclosed in JP2019-039393A is provided with an electromagnetic clutch which connects a mechanical supercharger to a crankshaft when an engine operates within a given high-load range. In this engine system, for example, when an accelerator pedal is depressed so as to shift the operation range of the engine from a low-load range to the high-load range, and thus a target engine torque becomes within a boosting range, the electromagnetic clutch connects the mechanical supercharger to the crankshaft. Accordingly, the mechanical supercharger can boost air to a combustion chamber of the engine to increase the engine torque.

Although the mechanical supercharger disclosed in JP2019-039393A excels in response compared with the exhaust-turbine supercharger as described above, acceleration delay of the vehicle may occur as a result of response delay of the electromagnetic clutch during re-acceleration.

That is, when a driver rapidly depresses the accelerator pedal, and then briefly lessens the depression of the accelerator pedal, the electromagnetic clutch is disengaged corresponding to the drop in the engine load, thus the supercharger being in a non-boosting state. Therefore, even when the accelerator pedal is subsequently depressed during the re-acceleration, a time-lag may occur between re-engagement of the electromagnetic clutch and a start of boosting. As a result, response delay of boosting by the supercharger may be caused during the re-acceleration, which may lead to acceleration delay of the vehicle.

SUMMARY OF THE DISCLOSURE

The present disclosure is made in view of the above situations, and one purpose thereof is to provide an engine system capable of reducing acceleration delay of a vehicle.

According to one aspect of the present disclosure, an engine system provided to a vehicle having an accelerator pedal is provided, which includes a supercharger driven by a crankshaft of an engine, an electromagnetic clutch disconnectably connecting the crankshaft to the supercharger, and a processor. The processor is configured to execute a determining module to determine, based on a target engine torque and an engine speed, whether an operation range of the engine is either one of a first range where the electromagnetic clutch is disengaged and a second range where the electromagnetic clutch is engaged, and a controlling module to control the engagement and disengagement of the electromagnetic clutch based on the determination of the determining module, and an opening of the accelerator pedal. When the determining module determines that the operation range of the engine shifts from the second range to the first range after the opening of the accelerator pedal increases at an increase rate below a given reference increase rate, the controlling module switches the electromagnetic clutch from the engaged state to the disengaged state after a given basic stand-by period passes from the shift to the first range. When the determining module determines that the operation range of the engine shifts from the second range to the first range after the opening of the accelerator pedal increases at an increase rate at or above the reference increase rate, the controlling module switches the electromagnetic clutch from the engaged state to the disengaged state after a given acceleration stand-by period passes from the shift to the first range, the acceleration stand-by period being longer than the basic stand-by period by a given added period.

According to this configuration, when the operation range of the engine shifts from the second range where the electromagnetic clutch is engaged to the first range where the electromagnetic clutch is disengaged, the electromagnetic clutch is switched from the engaged state to the disengaged state after a given time period passes. Therefore, immediately after the shift of the operation range of the engine from the second range to the first range, when the operation range returns again to the second range to make the electromagnetic clutch be engaged, the electromagnetic clutch is certainly in the engaged state immediately after the return. As a result, the delay in the shift of the electromagnetic clutch from the disengaged state to the engaged state can be avoided.

In addition, when the opening of the accelerator pedal increases at the increase rate at or above the reference increase rate and the engine operates in the second range (that is, when the operation range of the engine shifts to the second range in a state where the accelerator pedal is strongly depressed, and thus, the driver's demand for the acceleration is considered to be high), the stand-by period from the shift to the first range to the switch of the electromagnetic clutch to be disengaged is extended, compared with the case where the opening of the accelerator pedal increases at the increase rate below the reference increase rate and the engine operates in the second range (that is, when the operation range of the engine shifts to the second range in a state where the driver's demand for the acceleration is comparatively low). Therefore, when the driver's demand for the acceleration is high, that is, when the possibility of re-acceleration is high, the delay in the shift of the electromagnetic clutch from the disengaged state to the engaged state during the re-acceleration can be more certainly avoided, thereby improving acceleration performance during the re-acceleration.

The processor may be further configured to execute a measuring module to measure an elapsed time from the determination when the determining module determines that the operation range of the engine shifts from the second range to the first range after the opening of the accelerator pedal increases at the increase rate at or above the reference increase rate. When the determining module determines that the operation range of the engine shifts from the first range to the second range before a measurement time of the measuring module reaches the added period, the controlling module may reset the measurement time of the measuring module to zero.

According to this configuration, only when the opening of the accelerator pedal increases at the increase rate at or above the reference increase rate, and after that, the operation period of the engine in the first range continues exceeding the given acceleration stand-by period, is the electromagnetic clutch switched to the disengaged state. That is, the engaged state of the electromagnetic clutch is maintained until the possibility of re-acceleration sufficiently decreases. Therefore, the delay in the shift of the electromagnetic clutch during the re-acceleration can be more certainly avoided, and thus, the acceleration performance can be improved.

The acceleration stand-by period may be set to a fixed period regardless of a vehicle speed.

According to this configuration, variation in the sense of acceleration depending on the vehicle speed is reduced, thus the discomfort felt by the driver due to the variation can be prevented.

The acceleration stand-by period may be set to a fixed period regardless of a gear stage of the vehicle.

According to this configuration, variation in the sense of acceleration depending on the gear stage is reduced, thus the discomfort felt by the driver due to the variation can be prevented.

The supercharger may be a mechanical supercharger mechanically linked with an engine body.

A boosting range may include a range where spark ignition combustion, or spark controlled compression ignition combustion with an excess air ratio at 1, is performed.

A boosting range may include a range where spark ignition combustion, or spark controlled compression ignition combustion with an excess air ratio at 1, is performed, and a non-boosting range may include a range where spark controlled compression ignition combustion with an excess air ratio higher than 1 is performed.

When the operation range of the engine shifts from the first range to the second range while the increase rate in the opening of the accelerator pedal is below the reference increase rate and the electromagnetic clutch is accordingly switched from the disengaged state to the engaged state, and then the operation range shifts to the first range, the controlling module may switch the electromagnetic clutch to the disengaged state after the basic stand-by period from the shift to the first range.

When the operation range of the engine shifts from the first range to the second range while the increase rate in the opening of the accelerator pedal is at or above the reference increase rate and the electromagnetic clutch is accordingly switched from the disengaged state to the engaged state, and then the operation range shifts to the first range, the controlling module may determine, after the added period from the shift to the first range, to switch the electromagnetic clutch to the disengaged state, and then switch the electromagnetic clutch to the disengaged state after the basic stand-by period from the determination. The added period may be longer than the basic stand-by period.

DETAILED DESCRIPTION OF THE DISCLOSURE

Hereinafter, one preferred embodiment of the present disclosure is described in detail with reference to the accompanying drawings.

(1) Overall Configuration of Engine

Figure 1:
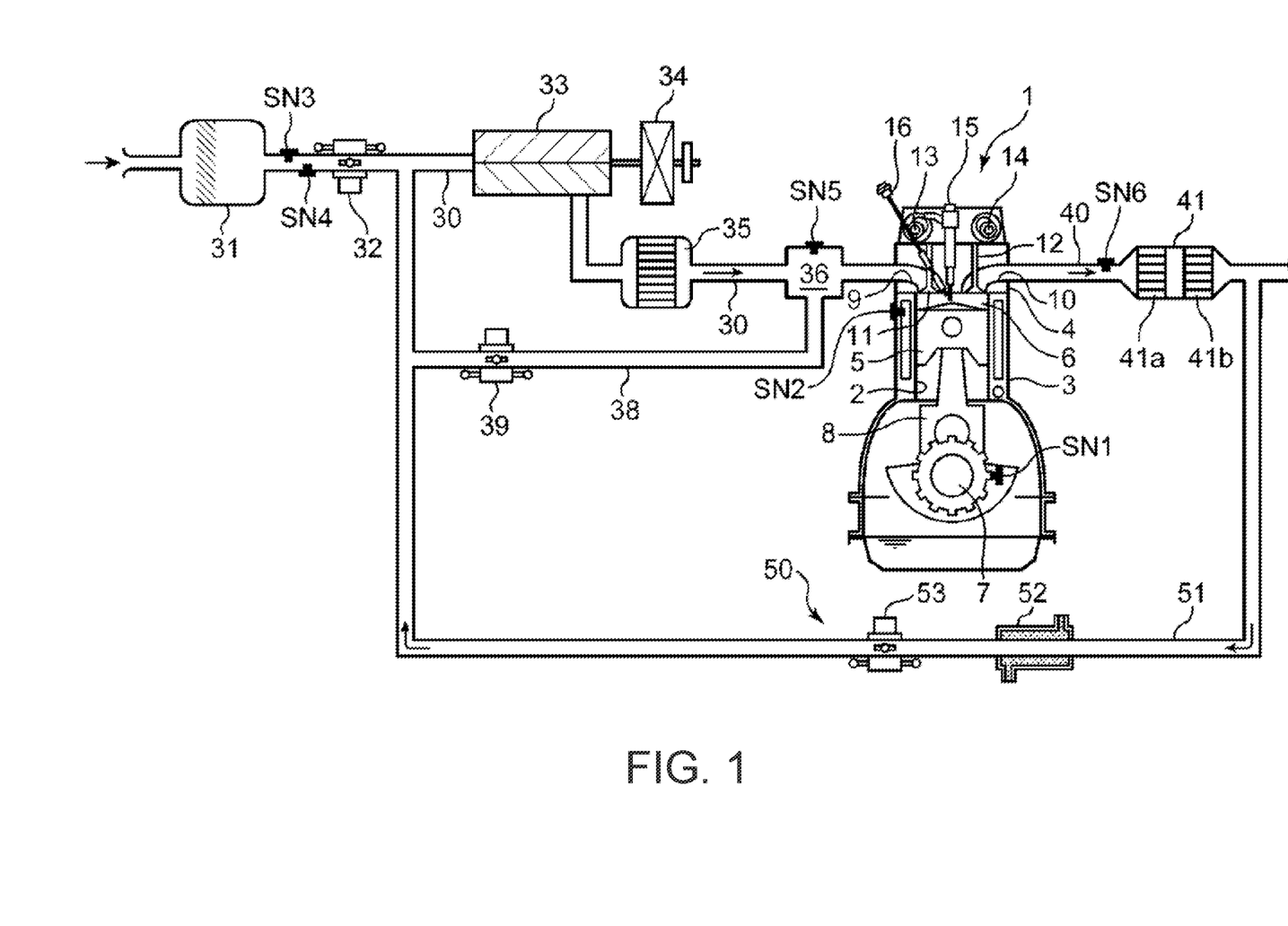
FIG. 1 is a system view illustrating the overall configuration of an engine system according to one embodiment of the present disclosure.

FIG. 1 is a system view illustrating the overall configuration of an engine system according to this embodiment of the present disclosure. An engine illustrated in FIG. 1 is a four-stroke gasoline-direct-injection engine mounted on a vehicle, and serves as a drive source for traveling. The engine is provided with an engine body 1, an intake passage 30 through which intake air to be introduced into the engine body 1 passes, an exhaust passage 40 through which exhaust gas discharged from the engine body 1 passes, and an external exhaust gas recirculation (EGR) device 50 which recirculates part of the exhaust gas passing through the exhaust passage 40 to the intake passage 30. Note that the engine of the present disclosure is not limited to a reciprocating engine in which a piston 5 reciprocates as illustrated in FIG. 1, but may be a rotary engine, as long as the engine has an output shaft which outputs a rotary-drive force.

The engine body 1 has a cylinder block 3 in which cylinders 2 are formed, a cylinder head 4 attached to an upper surface of the cylinder block 3 to close the cylinders 2 from above, and pistons 5 each reciprocatably inserted into the cylinder 2.

A combustion chamber 6 is defined above the piston 5, and fuel containing gasoline as a main component is supplied to the combustion chamber 6 by being injected from an injector 15 (described later). Then, the supplied fuel is mixed with air and combusts inside the combustion chamber 6, and an expansion force caused by the combustion reciprocates the piston 5 in an up-and-down direction.

Below the piston 5, a crankshaft 7 is provided which is an output shaft of the engine body 1. The crankshaft 7 is coupled to the piston 5 via a connecting rod 8, and is rotary-driven about its center axis corresponding to the reciprocating motion (up-and-down motion) of the piston 5.

The cylinder block 3 is provided with a crank angle sensor SN1 which detects a rotational angle of the crankshaft 7 (crank angle), and a rotational speed of the crankshaft 7 (engine speed), and a water temperature sensor SN2 which detects the temperature of coolant (engine water temperature) which passes through inside the cylinder block 3 and the cylinder head 4.

The cylinder head 4 is provided with an intake port 9 which introduces air supplied from the intake passage 30 to the combustion chamber 6, an exhaust port 10 which discharges exhaust gas generated inside the combustion chamber 6 to the exhaust passage 40, an intake valve 11 which opens and closes the opening of the intake port 9 on the combustion chamber 6 side, and an exhaust valve 12 which opens and closes the opening of the exhaust port 10 on the combustion chamber 6 side.

The intake valve 11 and the exhaust valve 12 are driven to open and close interlockingly with the rotation of the crankshaft 7, by a valve mechanism including a pair of camshafts provided to the cylinder head 4.

An intake S-VT 13, which can change the open and close timings of the intake valve 11, is built in the valve mechanism for the intake valve 11. Similarly, an exhaust S-VT 14, which can change the open and close timings of the exhaust valve 12, is built in the valve mechanism for the exhaust valve 12. The intake S-VT 13 (exhaust S-VT 14) is a so-called variable phase mechanism, and simultaneously changes the open timing and the close timing of the intake valve 11 (exhaust valve 12) by the same amount.

As illustrated in FIG. 1, the cylinder head 4 is provided with the injector 15 which injects fuel (gasoline) into the combustion chamber 6, and a spark plug 16 which ignites a mixture gas of intake air with fuel injected from the injector 15 into the combustion chamber 6. The injector 15 is disposed at the central part of a ceiling surface of the combustion chamber 6 such that a tip-end part of the injector 15 opposes to the central part of a crown surface of the piston 5. The spark plug 16 is disposed at a position somewhat deviated to the intake side with respect to the injector 15.

As illustrated in FIG. 1, the intake passage 30 is connected to one side surface of the cylinder head 4 to be communicated with the intake port 9. Air (fresh air) taken-in from an upstream end of the intake passage 30 is introduced into the combustion chamber 6 through the intake passage 30 and the intake port 9.

The intake passage 30 is provided with an air cleaner 31 which removes foreign matter contained in the intake air, a throttle valve 32 which is openable and closable to control a flow rate of the intake air, a supercharger 33 which compresses and sends out the intake air, an intercooler 35 which cools the intake air compressed by the supercharger 33, and a surge tank 36, in this order from the upstream side of the intake passage 30.

The intake passage 30 is provided, at the corresponding parts, with an airflow sensor SN3 which detects the flow rate of the intake air, an intake temperature sensor SN4 which detects the temperature of the intake air, and an intake pressure sensor SN5 which detects the pressure of the intake air. The airflow sensor SN3 and the intake temperature sensor SN4 are provided at a part of the intake passage 30 between the air cleaner 31 and the throttle valve 32 so as to detect the flow rate and the temperature of the intake air passing through this part, respectively. The intake pressure sensor SN5 is provided to the surge tank 36 to detect the pressure of the intake air inside the surge tank 36.

The supercharger 33 is a mechanical supercharger which is mechanically linked with the engine body 1. Although the configuration of the supercharger 33 is not particularly limited in detail, a known supercharger, such as a Lysholm-type, a Roots-type, or a centrifugal-type, may be used as the supercharger 33.

The supercharger 33 is driven by the crankshaft 7 (output shaft) of the engine body 1. The supercharger 33 is disposed in the intake passage 30 communicating with the combustion chamber 6 via the intake port 9 of the engine body 1.

An electromagnetic clutch 34 electrically switchable between engagement and disengagement is interposed between the supercharger 33 and the engine body 1. The electromagnetic clutch 34 disconnectably connects the crankshaft 7 to the supercharger 33. That is, when the electromagnetic clutch 34 is engaged, the drive force is transmitted from the engine body 1 to the supercharger 33 so that the supercharger 33 performs the boosting. On the other hand, when the electromagnetic clutch 34 is disengaged, the transmission of the drive force is interrupted so that the boosting by the supercharger 33 is suspended.

The intake passage 30 is provided with a bypass passage 38 which bypasses the supercharger 33. The bypass passage 38 connects the surge tank 36 and an EGR passage 51 (described later). The bypass passage 38 is provided with an openable bypass valve 39.

The exhaust passage 40 is connected to the other side surface (opposite from the intake passage 30) of the cylinder head 4 to be communicated with the exhaust port 10. Burnt gas generated inside the combustion chamber 6 is discharged outside through the exhaust port 10 and the exhaust passage 40.

The exhaust passage 40 is provided with a catalytic converter 41. The catalytic converter 41 includes a three-way catalyst 41a which removes harmful substances (HC, CO, and $NO_x$) contained in the exhaust gas passing through the exhaust passage 40, and a GPF (Gasoline Particulate Filter) 41b which captures particulate matter (PM) contained in the exhaust gas.

An air/fuel (A/F) sensor SN6 which detects an oxygen concentration in the exhaust gas is provided to a part of the exhaust passage 40 upstream of the catalytic converter 41.

The external EGR device 50 includes the EGR passage 51 connecting the exhaust passage 40 to the intake passage 30, an EGR cooler 52, and an EGR valve 53 which are provided to the EGR passage 51. The EGR passage 51 connects a part of the exhaust passage 40 downstream of the catalytic converter 41, to a part of the intake passage 30 between the throttle valve 32 and the supercharger 33. The EGR cooler 52 cools, by heat exchange, exhaust gas (external EGR gas) recirculating from the exhaust passage 40 to the intake passage 30 through the EGR passage 51. The EGR valve 53, which is able to open and close, is provided to the EGR passage 51 downstream of the EGR cooler 52 (closer side to the intake passage 30), and controls a flow rate of the exhaust gas passing through the EGR passage 51.

(2) Control System

Figure 2:
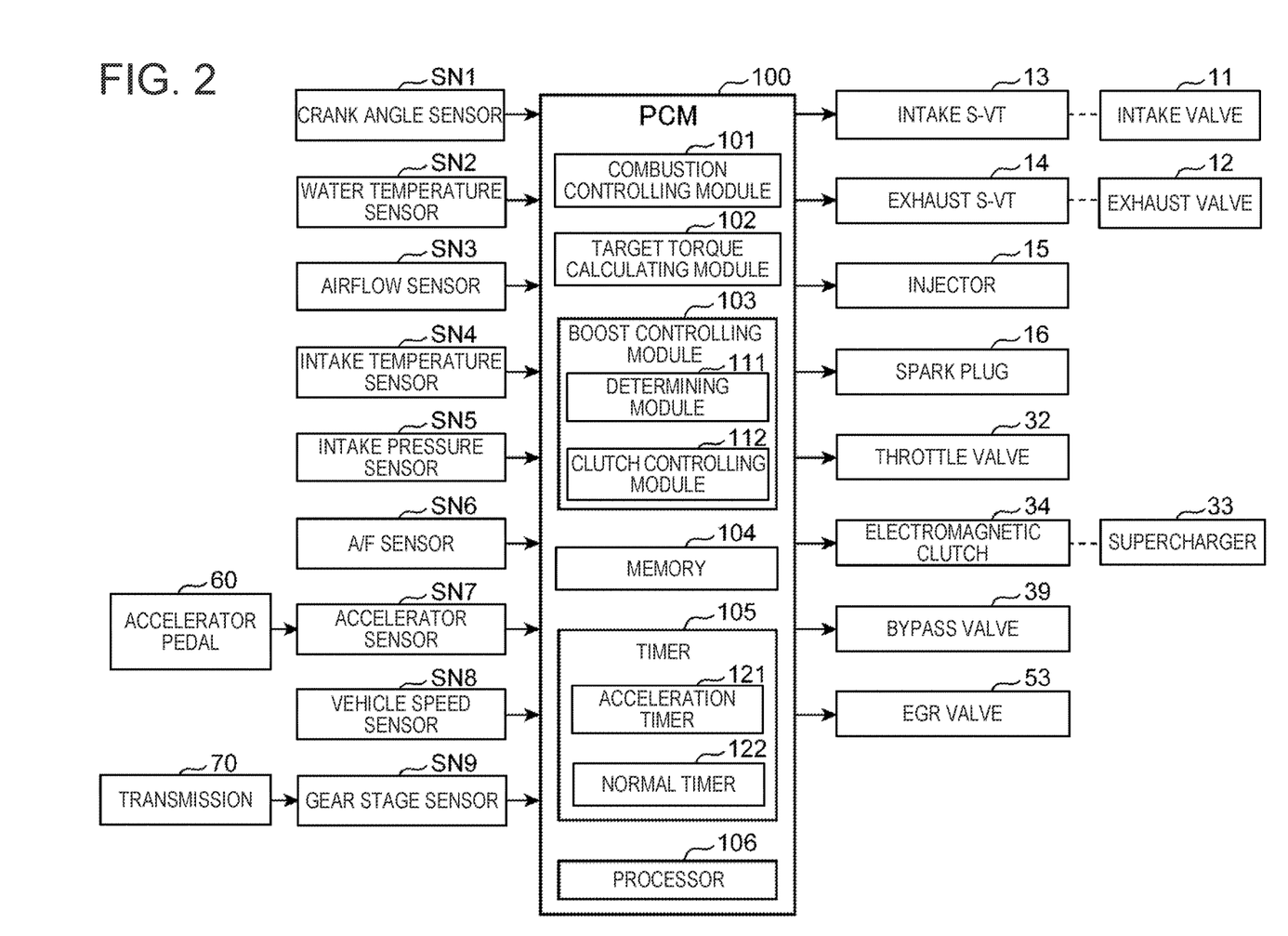
FIG. 2 is a block diagram illustrating a control system of the engine system illustrated in FIG. 1.

FIG. 2 is a block diagram illustrating a control system of the engine system. A powertrain control module (PCM) 100 illustrated in FIG. 2 is a microcomputer which integrally controls the engine, etc., and may be comprised of a well-known processor (e.g., a central processing unit (CPU), memory (e.g., ROM and/or RAM), etc.

The PCM 100 receives inputs of detection signals from the various sensors. For example, the PCM 100 is electrically connected to the crank angle sensor SN1, the water temperature sensor SN2, the airflow sensor SN3, the intake temperature sensor SN4, the intake pressure sensor SN5, and the A/F sensor SN6 described above, and information detected by these sensors (i.e., the crank angle, the engine speed, the engine water temperature, the intake flow rate, the intake temperature, the intake pressure, and the oxygen concentration in exhaust gas) is sequentially inputted into the PCM 100.

Moreover, the vehicle is provided with an accelerator sensor SN7 which detects an opening of an accelerator pedal 60 (hereinafter, referred to as an "accelerator opening") which is operated by a driver who drives the vehicle, and a vehicle speed sensor SN8 which detects a traveling speed of the vehicle (hereinafter, referred to as a "vehicle speed"). Furthermore, the vehicle is provided with a transmission 70 having a plurality of gear stages, and has a gear stage sensor SN9 which detects the current gear stage. Detection signals by these sensors SN7 to SN9 are also sequentially inputted into the PCM 100.

The PCM 100 controls each part of the engine while executing various determinations and calculations based on the input information from the various sensors described above. That is, the PCM 100 is electrically connected to, for example, the intake S-VT 13, the exhaust S-VT 14, the injector 15, the spark plug 16, the throttle valve 32, the electromagnetic clutch 34, the bypass valve 39, and the EGR valve 53, and outputs control signals to these devices based on the result of the calculations, etc.

In detail, the PCM 100 has a processor 106 configured to execute a combustion controlling module 101, a target torque calculating module 102, and a boost controlling module 103 to perform their respective functions and are stored in memory 104 as software modules. Moreover, the PCM 100 may have additionally stored in the memory 104, for example, various values and maps, and a timer 105 which measures time.

The combustion controlling module 101 is a control module which controls combustion of the mixture gas in the combustion chamber 6, and controls each part of the engine so that, for example, a combustion mode of the mixture gas becomes the corresponding mode (described later), and output torque of the engine becomes an appropriate value corresponding to a driver's demand.

The target torque calculating module 102 calculates a target engine torque which is a target value of the engine torque, based on, for example, the accelerator opening detected by the accelerator sensor SN7 (for example, based on the accelerator opening, the gear stage, the vehicle speed, and the engine speed).

The boost controlling module 103 controls the bypass valve 39 and the electromagnetic clutch 34. Details of control contents of the boost controlling module 103 will be described later.

(3) Combustion Control of Engine

Figure 3:
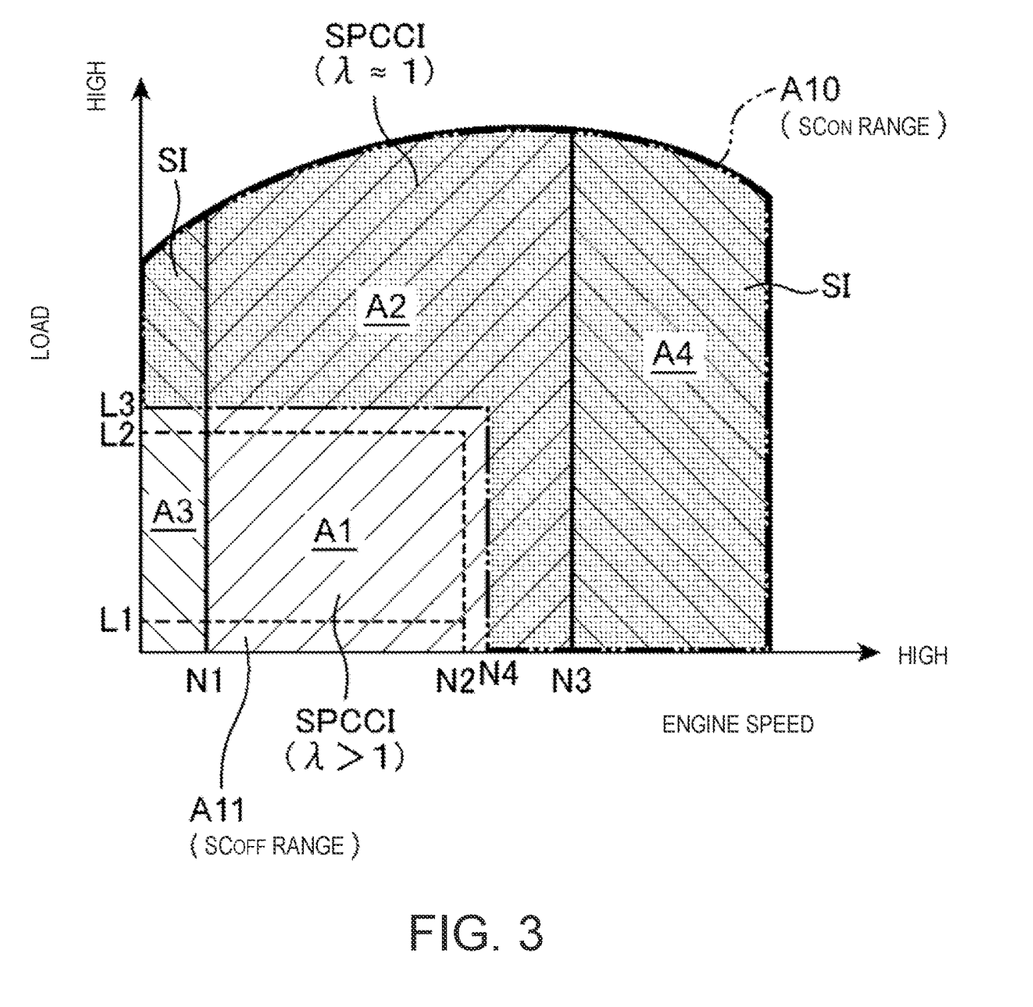
FIG. 3 is an operation map illustrating operation ranges of an engine, and control ranges of an electromagnetic clutch.

Combustion control of the engine is described. FIG. 3 is an operation map illustrating operation ranges of the engine, and control ranges of the supercharger 33. Note that the vertical axis of the graph in FIG. 3 indicates the engine load corresponding to the target engine torque.

As indicated in FIG. 3, the operation range of the engine is roughly divided into four operation ranges A1 to A4 according to the combustion mode. Suppose that the four operation ranges are a first operation range A1, a second operation range A2, a third operation range A3, and a fourth operation range A4, respectively, the third operation range A3 is a lowest-speed range where the engine speed is below a first speed N1, the fourth operation range A4 is a high-speed range where the engine speed is above a third speed N3, the first operation range A1 is a range where the target engine torque is comparatively low (where the engine load is comparatively low) within a speed range (low/middle-speed range) other than the third and fourth operation ranges A3 and A4 (i.e., a low-speed/low-load range), and the second operation range A2 is the remainder of the range other than the first, third, and fourth operation ranges A1, A3, and A4.

In the example of FIG. 3, the first operation range A1 is a range having a substantially rectangular shape positioned inward of the second operation range A2, and surrounded by the first speed N1 which is the minimum speed of the second operation range A2, a second speed N2 which is lower than the maximum speed (the third speed N3) of the second operation range A2, a first torque L1 higher than the minimum engine load, and a second torque L2 higher than the first torque L1.

The combustion controlling module 101 determines the current operation range of the engine among the first to fourth operation ranges, and controls the injector 15, etc., so that the combustion mode corresponding to the determined range is carried out.

SI (Spark Ignition) combustion is carried out in the third operation range A3 and the fourth operation range A4. In the first operation range A1 and the second operation range A2, partial compression ignition combustion (hereinafter, referred to as "SPCCI combustion") in which the SI combustion and CI (Compression Ignition) combustion are combined is carried out. Moreover, in the first operation range A1, an air-fuel (A/F) ratio of the mixture gas inside the combustion chamber 6 is higher than the stoichiometric A/F ratio such that an excess air ratio $\lambda$ is higher than 1. On the other hand, in the second operation range A2, the A/F ratio of the mixture gas is substantially at the stoichiometric A/F ratio such that the excess air ratio $\lambda$ is about 1. Accordingly, the second operation range A2 and the fourth operation range A4 are each one example of a boosting range in which the supercharger 33 is operated, and the first operation range A1 is one example of a non-boosting range in which the supercharger 33 is not operated.

The SI combustion is a combustion mode in which the mixture gas is ignited by a spark generated from the spark plug 16, and the combusting range is spread from the ignition point to the surrounding so that the mixture gas is forcibly combusted by flame propagation. The CI combustion is a combustion mode in which the mixture gas is combusted by self-ignition under an environment sufficiently increased in the temperature and pressure as a result of compression by the piston 5, etc. The SPCCI combustion, which is the combination of the SI combustion and the CI combustion, is a combustion mode in which part of the mixture gas inside the combustion chamber 6 is combusted by spark ignition (SI combustion) immediately before the self-ignition of the mixture gas, and the remaining mixture gas inside the combustion chamber 6 is combusted by self-ignition (CI combustion) after the SI combustion (by the further increase in the temperature and pressure resulting from the SI combustion). Note that "SPCCI" is the abbreviation of the "SPark Controlled Compression Ignition."

Figure 4:
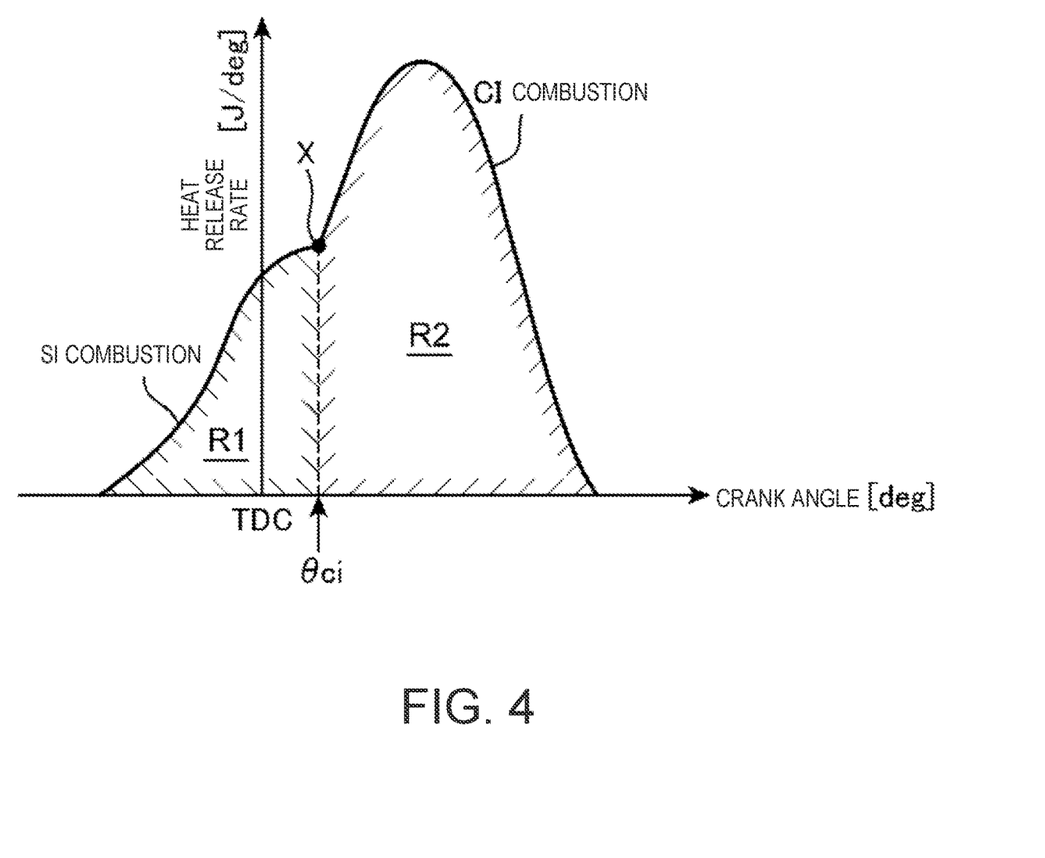
FIG. 4 is a graph illustrating a waveform of a heat release rate during SPCCI (SPark Controlled Compression Ignition) combustion.

FIG. 4 is a graph illustrating a combustion waveform during the SPCCI combustion (i.e., a change in a heat release rate (J/deg) with respect to the crank angle). As illustrated in FIG. 4, in the SPCCI combustion, a heat release by the SI combustion and a heat release by the CI combustion consecutively occur in this order. Here, due to the nature that the combustion speed is higher in the CI combustion, an initial rise of the heat release is sharper in the CI combustion compared with the SI combustion. Therefore, the waveform of the heat release rate in the SPCCI combustion has an inflection point X which appears at a switching timing $\theta$ci from the SI combustion (R1) to the CI combustion (R2).

(4) Control of Supercharger 33

The boost controlling module 103 controls the electromagnetic clutch 34, as well as controlling the bypass valve 39 to bring the boosting pressure at the target value.

In this embodiment, the supercharger 33 performs boosting within a bypass-valve-open range where the target engine torque is above a third torque L3 set in advance. The boost controlling module 103 determines whether the engine operates within the bypass-valve-open range based on the engine speed and the target engine torque. When the engine operates within the bypass-valve-open range, the boost controlling module 103 opens the bypass valve 39, whereas, in other cases, the boost controlling module 103 fully-closes the bypass valve 39. Moreover, when the bypass valve 39 is opened, the boost controlling module 103 controls the opening of the bypass valve 39 to achieve the target value of the boosting pressure calculated separately.

The supercharger 33 performs the boosting under the condition that the engine operates within the bypass-valve-open range as described above, but additionally, the clutch 34 connects the supercharger 33 to the crankshaft 7 when other conditions are satisfied. Below, control of the clutch 34 which is a characteristic part of the present disclosure is described in detail. The electromagnetic clutch 34 is simply referred to as the "clutch 34" below. Moreover, the state where the clutch 34 connects the supercharger 33 to the crankshaft 7 (i.e., in the engaged state of the clutch 34) is referred to as "clutch 34 is ON," and the state where the clutch 34 disconnects the supercharger 33 from the crankshaft 7 (i.e., in the disengaged state of the clutch 34) is referred to as "clutch 34 is OFF."

(Clutch Control)

The boost controlling module 103 has a determining module 111 and a clutch controlling module 112. The clutch controlling module 112 is an example of a "controlling module" of the present disclosure.

The determining module 111 determines whether the engine operates in an ON range A10 (SCon range; a dotted area surrounded by a two-dot chain line in FIG. 3), or operates in an OFF range A11 (SCoff range) other than the ON range A10. The ON range A10 is a range including the bypass-valve-open range, and comprised of a range where the engine speed is below a fourth speed N4 and the target engine torque is above the third torque L3, and a range where the engine speed is above the fourth speed N4. The fourth speed N4 is higher than the second speed N2 and lower than the third speed N3. The ON range A10 and the OFF range A11 are set and stored in the PCM 100 (the memory 104) in advance. The ON range A10 is an example of a "second range," and the OFF range A11 is an example of a "first range" in the present disclosure.

The clutch controlling module 112 switches the clutch 34 between ON (engaged state) and OFF (disengaged state) based on the determination result of the determining module 111 and the accelerator opening.

When the determining module 111 determines that the operation range of the engine shifts from the OFF range A11 to the ON range A10, the clutch controlling module 112 switches the clutch 34 from OFF to ON.

Moreover, when the determining module 111 determines that the operation range of the engine shifts from the ON range A10 to the OFF range A11, the clutch controlling module 112 switches the clutch 34 from ON to OFF. However, even when the determining module 111 determines that the operation range shifts to the OFF range A11, the clutch controlling module 112 does not immediately switch the clutch 34 to OFF, but turns the clutch 34 OFF after a given period of time from the determination (from the shift to the OFF range A11). Furthermore, the clutch controlling module 112 changes this time period according to the accelerator opening at the time of the shift from the OFF range A11 to the ON range A10.

For example, when the operation range of the engine shifts from the OFF range A11 to the ON range A10 while an increase rate in the accelerator opening is below a reference increase rate and the clutch 34 is accordingly switched from OFF to ON, and then the operation range shifts to the OFF range A11, the clutch controlling module 112 determines, corresponding to the shift of the operation range to the OFF range A11, to turn the clutch 34 OFF. Then, the clutch controlling module 112 turns OFF the clutch 34 after a first period from the shift to the OFF range A11. The first period is set and stored in the PCM 100 (the memory 104) in advance. For example, the first period is set to one second.

On the other hand, when the operation range of the engine shifts from the OFF range A11 to the ON range A10 while the increase rate in the accelerator opening is at or above the reference increase rate and the clutch 34 is accordingly switched from OFF to ON, and then the operation range shifts to the OFF range A11, the clutch controlling module 112 determines, after a second period from the shift of the operation range to the OFF range A11, to turn the clutch 34 OFF. Then, further after the first period from this determination, the clutch controlling module 112 turns OFF the clutch 34. The second period is set and stored in the PCM 100 (the memory 104) in advance. For example, the second period is set to five seconds.

The increase rate in the accelerator opening is an increased amount of the accelerator opening per unit time. The clutch controlling module 112 calculates all the time the increase rate in the accelerator opening based on the detection value of the accelerator sensor SN7. The reference increase rate is set to a value larger than 0 (zero), and stored in the PCM 100 (the memory 104) in advance. In this embodiment, the reference increase rate is set to a value such that, when the accelerator pedal 60 is depressed so that the increase rate in the accelerator opening becomes at or above the reference increase rate while the engine operates in the OFF range A11, the operation range of the engine then certainly shifts to the ON range A10. For example, the reference increase rate is set to 50%/100 ms. Note that this is a value supposing that the accelerator opening is 0% when the accelerator pedal 60 is not depressed, and the accelerator opening is 100% when the accelerator pedal 60 is depressed to the maximum.

As described above, in the case where the operation range of the engine shifts to the OFF range A11, after the operation range shifts from the OFF range A11 to the ON range A10 while the increase rate in the accelerator opening is below the reference increase rate and the clutch 34 is accordingly switched from OFF to ON, the clutch 34 is turned OFF after the first period from the shift of the operation range to the OFF range A11. On the other hand, in the case where the operation range of the engine shifts to the OFF range A11, after the operation range shifts from the OFF range A11 to the ON range A10 while the increase rate in the accelerator opening is at or above the reference increase rate and the clutch 34 is accordingly switched from OFF to ON, the clutch 34 is turned OFF after a third period (the total of the first period and the second period) from the shift of the operation range to the OFF range A11. That is, in this case, the period of time from the shift of the operation range to the OFF range A11, to the switching of the clutch 34 to OFF, is longer by the second period, compared with the case where the operation range shifts from the OFF range A11 to the ON range A10 while the increase rate in the accelerator opening is below the reference increase rate.

Below, the shift of the operation range of the engine from the OFF range A11 to the ON range A10 while the increase rate in the accelerator opening is at or above the reference increase rate may suitably be referred to as a "shift to the ON range A10 in an accelerated state," and the shift of the operation range from the OFF range A11 to the ON range A10 while the increase rate in the accelerator opening is below the reference increase rate may suitably be referred to as a "shift to the ON range A10 in a normal state."

In this embodiment, the first period, the second period, and the third period are each set to fixed values regardless of the operating state of the engine or the vehicle. That is, these periods are each set to the fixed values regardless of the vehicle speed detected by the vehicle speed sensor SN8 and the gear stage detected by the gear stage sensor SN9. The first period is an example of a "basic stand-by period," the third period is an example of an "acceleration stand-by period," and the second period is an example of an "added period" of the present disclosure.

The elapsed time from the shift of the operation range of the engine to the OFF range A11 is measured by the timer 105. The PCM 100 includes, as the timer 105, an acceleration timer 121 which measures an elapsed time from the shift to the OFF range A11 after the shift to the ON range A10 in the accelerated state, and a normal timer 122 which measures an elapsed time from the determination by the clutch controlling module 112 to turn the clutch 34 OFF. The acceleration timer 121 is an example of a "measuring module" of the present disclosure.

When the operation range of the engine shifts to the OFF range A11 after the shift to the ON range A10 in the accelerated state, the clutch controlling module 112 actuates the acceleration timer 121 to start the measuring. Then, when the measurement time of the acceleration timer 121 exceeds the second period, the clutch controlling module 112 determines to switch the clutch 34 from ON to OFF. Moreover, when the measurement time of the acceleration timer 121 exceeds the second period, the clutch controlling module 112 suspends the operation of the acceleration timer 121 and resets the measurement time to zero.

When the clutch controlling module 112 determines to switch the clutch 34 from ON to OFF, it actuates the normal timer 122 to start the measuring. Then, when the measurement time of the normal timer 122 exceeds the first period, the clutch controlling module 112 switches the clutch 34 from ON to OFF. Moreover, when the measurement time of the normal timer 122 exceeds the first period, the clutch controlling module 112 suspends the operation of the normal timer 122, and resets the measurement time to zero.

Furthermore, when the operation range of the engine shifts from the OFF range A11 to the ON range A10 during the operations of the acceleration timer 121 and the normal timer 122 (as for the acceleration timer 121, before the measurement time reaches the second period, and as for the normal timer 122, before the measurement time reaches the first period), the clutch controlling module 112 suspends the operations of the timers 121 and 122, and sets their measurement times to zero. Accordingly, when the operation range shifts to the OFF range A11 after the shift to the ON range A10 in the accelerated state, the clutch 34 is switched from ON to OFF only after the operation range continues to be in the OFF range A11 for the third period. Moreover, when the operation range shifts to the OFF range A11 after the shift to the ON range A10 in the normal state, the clutch 34 is switched from ON to OFF only after the operation range continues to be in the OFF range A11 for the first period.

Figure 5:
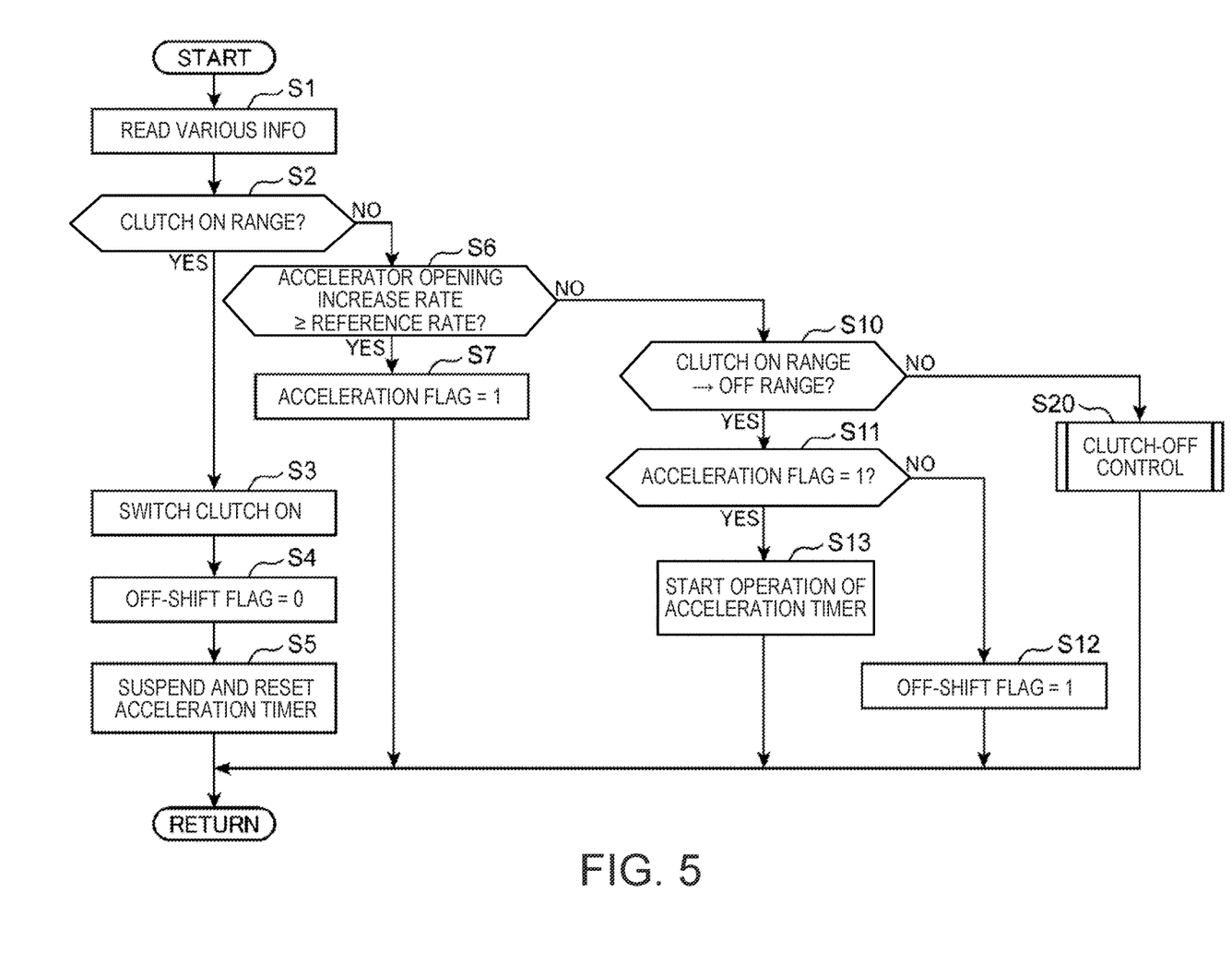
FIG. 5 is a flowchart illustrating a control flow of the electromagnetic clutch illustrated in FIG. 1.
Figure 6:
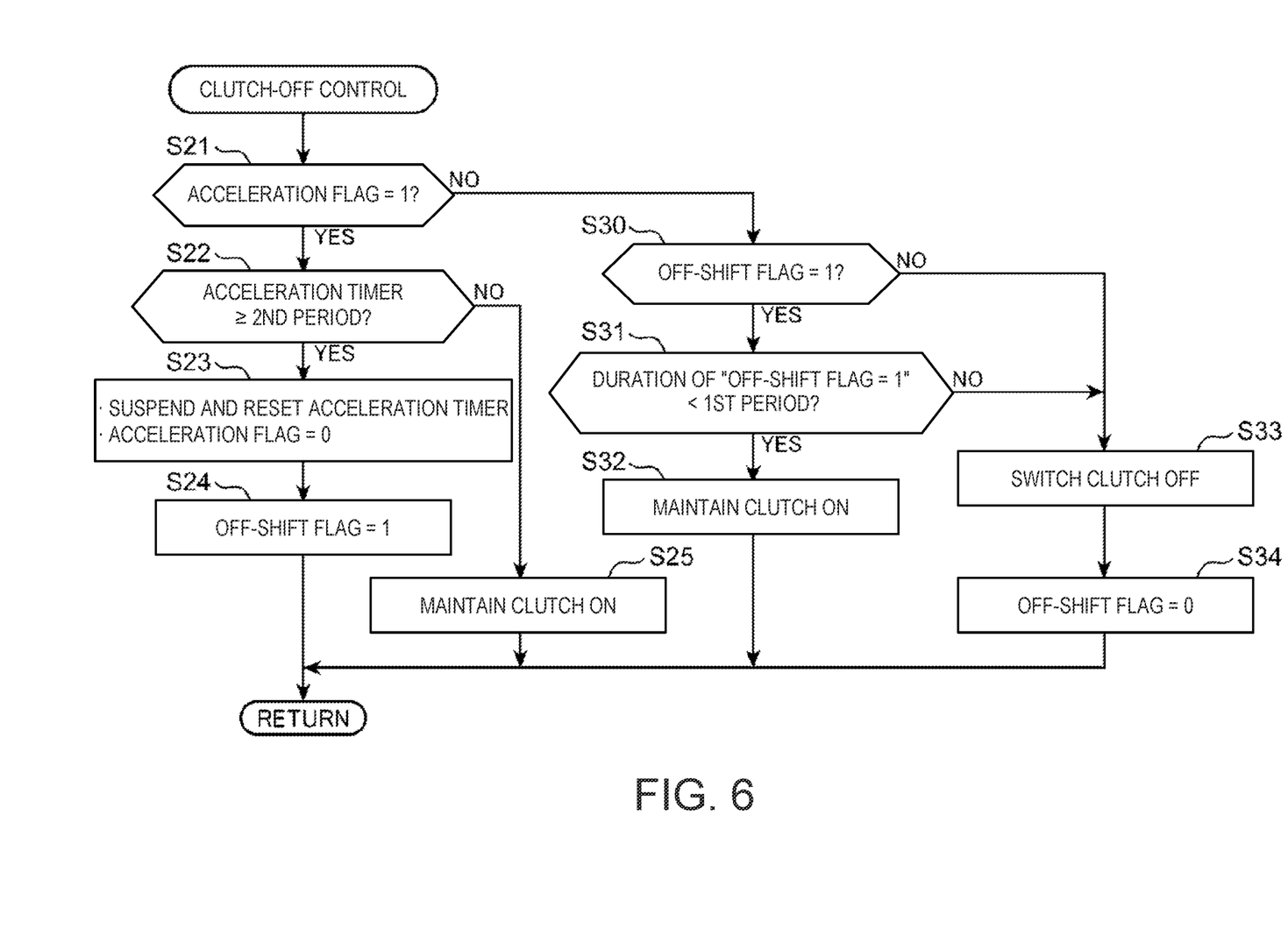
FIG. 6 is a flowchart illustrating a subroutine of a clutch-OFF control.

The control of the PCM 100 (the clutch controlling module 112, the determining module 111, and the timer 105) described above is summarized in the flowcharts in FIGS. 5 and 6. FIG. 6 is a flowchart illustrating processing (subroutine) of step S20 of the flowchart in FIG. 5. Each step in FIG. 5 is repeatedly executed every given time.

First, the PCM 100 reads various information (step S1). The PCM 100 reads at least the target engine torque calculated separately (by the target torque calculating module 102), the engine speed detected by the crank angle sensor SN1, and the accelerator opening detected by the accelerator sensor SN7.

Next, the PCM 10 determines whether the operation range of the engine is the ON range A10 (step S2).

If the PCM 100 determines that the operation range of the engine is the OFF range A11 (step S2: NO), the PCM 100 determines whether the increase rate in the accelerator opening is at or above the reference increase rate (step S6). If the PCM 100 determines that the increase rate in the accelerator opening is at or above the reference increase rate (step S6: YES), the PCM 100 sets an acceleration flag to 1 (step S7), and returns to step S1.

On the other hand, if the PCM 100 determines that the operation range of the engine is the ON range A10 (step S2: YES), the PCM 100 turns the clutch 34 ON (step S3), sets an OFF-shift flag to 0 (step S4), and suspends and resets the acceleration timer 121 (step S5). Note that if the clutch 34 has already been ON, it remains being ON, and if the shift flag has already been at 0, it remains at 0. Moreover, if the operation of the acceleration timer 121 has been suspended and its measurement time has already been 0, the suspension and the measurement time at 0 are maintained.

Here, as described above, when the increase rate in the accelerator opening becomes at or above the reference increase rate while the engine operates in the OFF range A11, the operation range of the engine then shifts to the ON range A10. Therefore, the PCM 100 determines as YES at step S2 in a calculation cycle after the determination as YES at Step S6, and executes steps S3, S4, and S5 subsequentially. That is, when the increase rate in the accelerator opening becomes at or above the reference increase rate while the engine operates in the OFF range A11, the clutch 34 is then turned ON, the OFF-shift flag is set to 0, and the acceleration timer 121 is suspended and reset. The acceleration flag described above is a flag which is incremented to "1" when the increase rate in the accelerator opening becomes at or above the reference increase rate while the engine operates in the OFF range A11. The acceleration flag being "1" means that the accelerator opening increases at an increase rate at or above the reference increase rate, and the operation range of the engine shifts from the OFF range A11 to the ON range A10, that is, the shift to the ON range A10 in the accelerated state is executed. Note that an initial value (a value at a start of the engine) of each of the acceleration flag and the OFF-shift flag is 0.

Referring again to step S6, if the PCM 100 determines that the increase rate in the accelerator opening is below the reference increase rate (step S6: NO), the PCM 100 determines whether the operation range of the engine is immediately after the shift from the ON range A10 to the OFF range A11 (step S10). In detail, the PCM 100 determines whether the operation range determined one calculation-cycle before is the ON range A10.

If the PCM 100 determines that the operation range is immediately after the shift from the ON range A10 to the OFF range A11 (step S10: YES), the PCM 100 determines whether the acceleration flag is 1, that is, whether the operation range shifted to the ON range A10 in the accelerated state (step S11).

If the PCM 100 determines that the acceleration flag is not 1, that is, the operation range shifts to the OFF range A11 not after the shift to the ON range A10 in the accelerated state, but after the shift to the ON range A10 in the normal state (step S11: NO), the PCM 100 sets the OFF-shift flag to 1 (step S12), and returns to step S1. The OFF-shift flag is a flag which is incremented to "1" when the PCM 100 determines to switch the clutch 34 from ON to OFF, and in the case of the shifting of the operation range to the OFF range A11 after the shift to the ON range A10 in the normal state, the OFF-shift flag is set to 1 corresponding to the shift to the OFF range A11.

On the other hand, if the PCM 100 determines that acceleration flag is 1, and the operation range shifts to the OFF range A11 after the shift to the ON range A10 in the accelerated state (step S11: YES), the PCM 100 starts the operation of the acceleration timer 121 (step S13) and returns to step S1.

Referring again to step S10, if the PCM 100 determines that the operation range of the engine is not immediately after the shift from the ON range A10 to the OFF range A11 (step S10: NO), the PCM 100 executes a clutch-OFF control to turn the clutch 34 OFF (step S20).

In the clutch-OFF control, the PCM 100 first determines whether the acceleration flag is 1 (step S21). If the PCM 100 determines that the acceleration flag is 1 (step S21: YES), the PCM 100 determines whether the measurement time of the acceleration timer 121 is the second period or longer (step S22). If the PCM 100 determines that the measurement time of the acceleration timer 121 is longer than the second period or longer (step S22: YES), the PCM 100 suspends and resets the acceleration timer 121 and sets the acceleration flag back to 0 (step S23). Moreover, the PCM 100 sets the OFF-shift flag to 1 (step S24).

On the other hand, if the PCM 100 determines that the measurement time of the acceleration timer 121 is shorter than the second period (step S22: NO), the PCM 100 maintains the clutch 34 to be ON (step S25), and returns to step S1.

Referring again to step S21, if the PCM 100 determines that the acceleration flag is not 1 (step S21: NO), the PCM 100 determines whether the OFF-shift flag is 1 (step S30). If the PCM 100 determines that the OFF-shift flag is 1 (step S30: YES), the PCM 100 determines whether the OFF-shift flag has been 1 for a period shorter than the first period (step S31). If the PCM 100 determines that the OFF-shift flag has been 1 for a period shorter than the first period (step S31: YES), the PCM 100 maintains the clutch 34 to be ON (step S32) and returns to step S1.

On the other hand, if the PCM 100 determines that the OFF-shift flag has been 1 for the first period or longer (step S31: NO), the PCM 100 turns the clutch 34 OFF (step S33). Moreover, the PCM 100 sets the OFF-shift flag to 0 (step S34) and returns to step S1. Further, also if the PCM 100 determines that the OFF-shift flag is 0 (step S30: NO), the PCM 100 turns the clutch 34 OFF (step S33), and sets the OFF-shift flag to 0 (step S34). Note that if the OFF-shift flag is determined to be 0 (step S30: NO), the clutch 34 has already been OFF and the operation range of the engine is the OFF range A11, and thus, the clutch 34 remains being OFF and the OFF-shift flag remains at 0.

Figure 7:
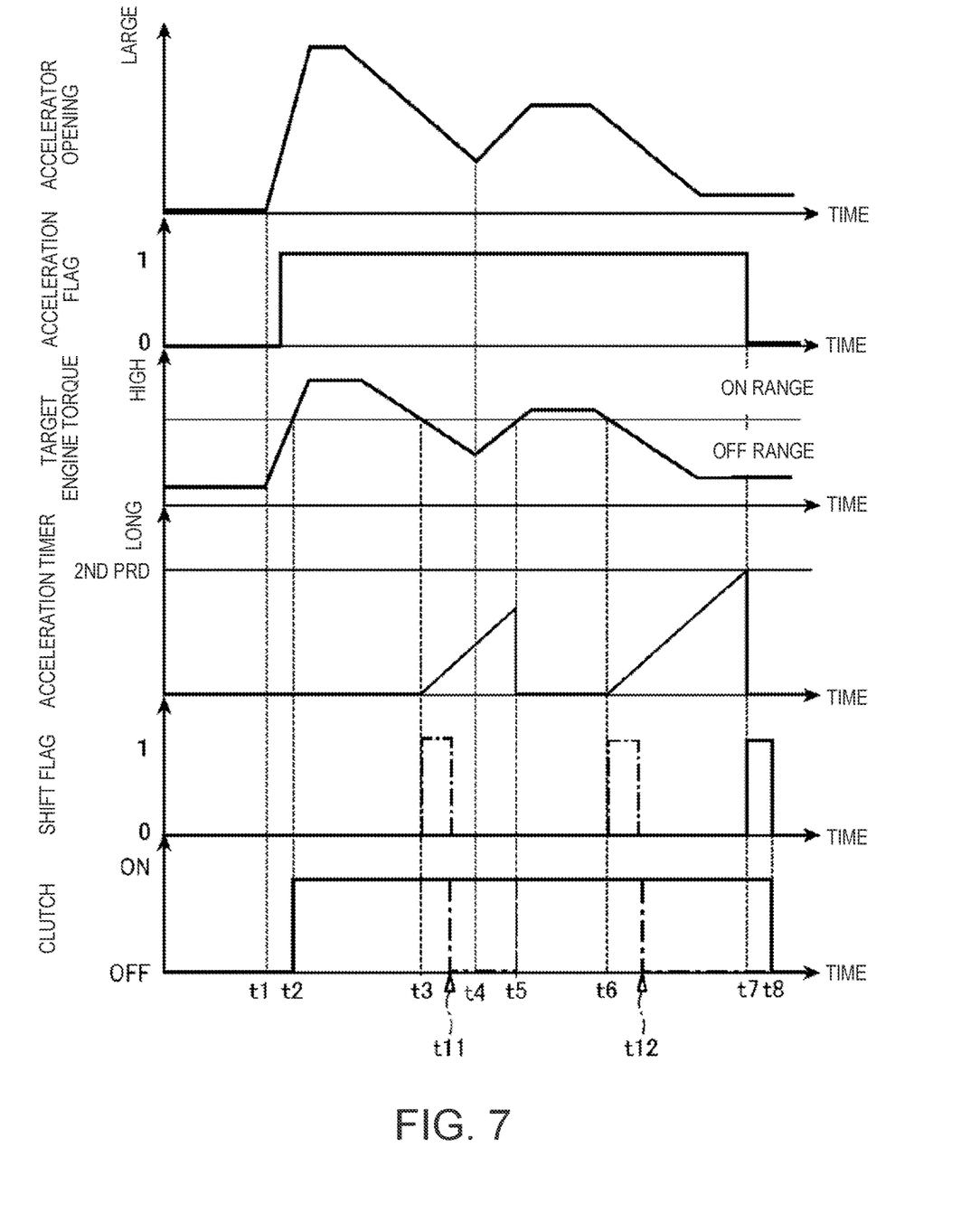
FIG. 7 is a time chart illustrating temporal changes of parameters during the control of the electromagnetic clutch illustrated in FIG. 1.

FIG. 7 illustrates one example of temporal changes of parameters when the above control is executed. Solid lines indicate one example of temporal changes according to this embodiment. Chain lines indicate a comparative example, where, even upon the shift to the OFF range A11 after the shift to the ON range A10 in the accelerated state, a control similar to the shift to the OFF range A11 after the shift to the ON range A10 in the normal state is executed. Moreover, graphs in FIG. 7 illustrate the states of the accelerator opening, the acceleration flag, the target engine torque, the acceleration timer 121, the shift flag, and the clutch 34, respectively, in this order from above.

When the accelerator pedal 60 is depressed at a time t1 while the increase rate in the accelerator opening is at or above the reference increase rate, the acceleration flag is incremented from 0 to 1. When the accelerator pedal 60 is depressed, the target engine torque increases. As a result, the operation range of the engine shifts at a time t2 from the OFF range A11 to the ON range A10. Accompanying with this, the clutch 34 is switched at the time t2 from OFF to ON.

Then, when the depression of the accelerator pedal 60 is weakened, and the target engine torque is reduced, the operation range of the engine shifts at a time t3 from the ON range A10 to the OFF range A11. Since the operation range shifts to the OFF range A11 while the acceleration flag is 1 (i.e., the shift to the OFF range A11 after the shift to the ON range A10 in the accelerated state), the operation of the acceleration timer 121 starts at the time t3.

Here, as indicated by the chain lines, in the comparative example, the shift flag is incremented to 1 as the operation range of the engine shifts to the OFF range A11 at the time t3. Then, the clutch 34 is switched OFF at a time t11 after the first period from the incrementation of the shift flag to 1. Therefore, in the comparative example, the clutch 34 is required to be switched from OFF to ON when the accelerator pedal 60 is depressed again at a time t4, and the operation range of the engine returns to the ON range A10 from the OFF range A11 at a time t5. As a result, the boosting by the supercharger 33 delays by the switching time of the clutch 34, which leads to degradation in acceleration performance of the vehicle.

On the other hand, as indicated by the solid lines, in this embodiment, the shift flag is not incremented to 1 at the time t3, and the clutch 34 remains being ON even after the time t11. Then, since the measurement time of the acceleration timer 121 has not yet reached the second period even at the time t5, the shift flag remains at 0, and the clutch 34 remains being ON. As a result, when the operation range of the engine returns to the ON range A10 at the time t5 accompanying with the depressing of the accelerator pedal 60, the supercharger 33 can boost early, and thus, high acceleration performance can be achieved.

As described above, the acceleration flag is returned to 0 only after the measurement time of the acceleration timer 121 reaches the second period. Therefore, even after the time t3, the acceleration flag remains at 1. On the other hand, if the operation range of the engine shifts from the OFF range A11 to the ON range A10 while the measurement time of the acceleration timer 121 does not reach the second period, the acceleration timer 121 is reset. Accordingly, the measurement time of the acceleration timer 121 is returned to 0 at the time t5.

In the example of FIG. 7, the operation range of the engine then shifts from the ON range A10 to the OFF range A11 at a time t6. According to this, the operation of the acceleration timer 121 starts at the time t6. Here, the measurement time of the acceleration timer 121 reaches the second period at a time t7, and accordingly, the acceleration flag is returned to 0, and the acceleration timer 121 is reset. Moreover, the shift flag is set to 1 at the time t7, and the clutch 34 is switched from ON to OFF at a time t8 after the first period from the time t7. Note that, in the comparative example, the shift flag is set to 1 at the time t6, and the clutch 34 is switched from ON to OFF at a time t12 after the first period from the time t6.

(5) Operation, Etc.

As described above, in this embodiment, when the operation range of the engine shifts from the ON range A10 (where the clutch 34 is engaged) to the OFF range A11

(where the clutch 34 is disengaged), the clutch 34 is switched from ON to OFF after a given time period from the shift to the OFF range A11. Therefore, when the operation range returns to the ON range A10 immediately after the shift to the OFF range A11, the clutch 34 is certainly in the engaged state. As a result, the delay in the shift of the clutch 34 from the disengaged state to the engaged state, thus the delay in the driving of the supercharger 33, can be avoided.

Moreover, the driver strongly depresses the accelerator pedal 60 when he/she is to accelerate the vehicle, and even the depression of the accelerator pedal 60 is briefly lessened, it is highly possible that he/she will depress the accelerator pedal 60 again to re-accelerate the vehicle. With regard to this, in this embodiment, when shifting the operation range to the OFF range A11 after the shift to the ON range A10 while the increase rate in the accelerator opening is below the reference increase rate, the clutch 34 is switched OFF after the first period from the shift to the OFF range A11. On the other hand, when shifting the operation range to the OFF range A11 after the shift to the ON range A10 while the increase rate in the accelerator opening is at or above the reference increase rate, the clutch 34 is switched OFF after the third period longer than the first period (the third period=the second period+the first period), from the shift to the OFF range A11. Therefore, when the operation range returns to the ON range A10 by the re-acceleration after the shift to the OFF range A11, the delay in the shift of the clutch 34 from the disengaged state to the engaged state, thus the delay in the driving of the supercharger 33, can be more certainly avoided, thereby the acceleration performance during the re-acceleration being improved more certainly.

Moreover, in this embodiment, the clutch 34 is switched from ON to OFF only after the measurement time of the acceleration timer 121 reaches the second period and after the measurement time of the normal timer 122 reaches the first period. Then, if the operation range of the engine returns from the OFF range A11 to the ON range A10 during the operations of the acceleration timer 121 and the normal timer 122 (as for the acceleration timer 121, before its measurement time reaches the second period, and as for the normal timer 122, before its measurement time reaches the first period), the operations of the timers 121 and 122 are suspended, and their measurement times are reset to 0. That is, in this embodiment, when the operation range shifts from the OFF range A11 to the ON range A10 while the increase rate in the accelerator opening is at or above the reference increase rate, the clutch 34 is switched from ON to OFF only when the operation range shifts to the OFF range A11 and the operation period of the engine continues to be in the OFF range A11 for longer than the third period.

Therefore, when the driver's demand for the acceleration is considered to be high, the clutch 34 can remain being ON until the operation period of the engine continues to be in the OFF range A11 for longer than the third period, and the possibility of re-acceleration sufficiently decreases. That is, the clutch 34 remains being ON as long as the possibility of re-acceleration and another re-acceleration is high. Therefore, the delay in the shift of the electromagnetic clutch 34 to the engaged state during the re-acceleration and another re-acceleration can be more certainly avoided, and thus, the acceleration performance can be improved further certainly.

Moreover, if each of the first period, the second period, and the third period (the total of the first and second periods) is set differently according to the vehicle speed and the gear stage, the switching timing of the clutch 34 to OFF varies depending on the vehicle speed and the gear stage. As a result, even if the operating state of the engine is the same, difference in the sense of acceleration may be caused, and the driver may feel uncomfortable.

With regard to this, in this embodiment, the first period, the second period, and the third period are each set to be fixed regardless of the vehicle speed and the gear stage. Therefore, the variation in the sense of acceleration according to the vehicle speed and the gear stage can be prevented, thus the discomfort felt by the driver being prevented.

(6) Modifications

The concrete values of the first period and the second period are not limited to the above. Moreover, the concrete ranges of the ON range A10 where the clutch 34 is ON, and the OFF range A11 where the clutch 34 is OFF are not limited to the above. Furthermore, in this embodiment, the operation ranges of the engine used for the determination are common between the switching of the clutch 34 from OFF to ON, and from ON to OFF. However, a hysteresis may be provided between the switching from OFF to ON, and the switching from ON to OFF so that the operation ranges of the engine for the switching from ON to OFF are on the lower-speed side compared with the operation ranges for the switching from OFF to ON.

The combustion modes of the engine body 1 are not limited to the above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
7 Crankshaft (Output Shaft)
33 Supercharger
34 Clutch (Electromagnetic Clutch)
60 Accelerator Pedal
70 Transmission
100 PCM (Powertrain Control Module)
102 Target Torque Calculating Module
103 Boost Controlling Module
111 Determining Module
112 Clutch Controlling Module (Controlling Module)

What is claimed is:

1. An engine system provided to a vehicle having an accelerator pedal, comprising:
   a supercharger driven by a crankshaft of an engine;
   an electromagnetic clutch disconnectably connecting the crankshaft to the supercharger; and
   a processor configured to execute:
      a determining module to determine, based on a target engine torque and an engine speed, whether an operation range of the engine is either one of a first range where the electromagnetic clutch is disengaged and a second range where the electromagnetic clutch is engaged; and
      a controlling module to control the engagement and disengagement of the electromagnetic clutch based on the determination of the determining module, and an opening of the accelerator pedal,
   wherein when the determining module determines that the operation range of the engine shifts from the second range to the first range after the opening of the accelerator pedal increases at an increase rate below a given reference increase rate, the controlling module switches the electromagnetic clutch from the engaged state to the disengaged state after a given basic stand-by period passes from the shift to the first range, and wherein when the determining module determines that the operation range of the engine shifts from the second range to the first range after the opening of the accelerator pedal increases at an increase rate at or above the reference increase rate, the controlling module switches the electromagnetic clutch from the engaged state to the disengaged state after a given acceleration stand-by period passes from the shift to the first range, the acceleration stand-by period being longer than the basic stand-by period by a given added period.

2. The engine system of claim 1, wherein the processor is further configured to execute a measuring module to measure an elapsed time from the determination when the determining module determines that the operation range of the engine shifts from the second range to the first range after the opening of the accelerator pedal increases at the increase rate at or above the reference increase rate, wherein when the determining module determines that the operation range of the engine shifts from the first range to the second range before a measurement time of the measuring module reaches the added period, the controlling module resets the measurement time of the measuring module to zero.

3. The engine system of claim 2, wherein the acceleration stand-by period is set to a fixed period regardless of a vehicle speed.

4. The engine system of claim 3, wherein a boosting range includes a range where spark ignition combustion, or spark controlled compression ignition combustion with an excess air ratio at 1, is performed.

5. The engine system of claim 3, wherein a boosting range includes a range where spark ignition combustion, or spark controlled compression ignition combustion with an excess air ratio at 1, is performed, and wherein a non-boosting range includes a range where spark controlled compression ignition combustion with an excess air ratio higher than 1 is performed.

6. The engine system of claim 2, wherein the acceleration stand-by period is set to a fixed period regardless of a gear stage of the vehicle.

7. The engine system of claim 6, wherein a boosting range includes a range where spark ignition combustion, or spark controlled compression ignition combustion with an excess air ratio at 1, is performed.

8. The engine system of claim 6, wherein a boosting range includes a range where spark ignition combustion, or spark controlled compression ignition combustion with an excess air ratio at 1, is performed, and wherein a non-boosting range includes a range where spark controlled compression ignition combustion with an excess air ratio higher than 1 is performed.

9. The engine system of claim 2, wherein a boosting range includes a range where spark ignition combustion, or spark controlled compression ignition combustion with an excess air ratio at 1, is performed.

10. The engine system of claim 2, wherein a boosting range includes a range where spark ignition combustion, or spark controlled compression ignition combustion with an excess air ratio at 1, is performed, and wherein a non-boosting range includes a range where spark controlled compression ignition combustion with an excess air ratio higher than 1 is performed.

11. The engine system of claim 1, wherein the acceleration stand-by period is set to a fixed period regardless of a vehicle speed.

12. The engine system of claim 11, wherein a boosting range includes a range where spark ignition combustion, or spark controlled compression ignition combustion with an excess air ratio at 1, is performed.

13. The engine system of claim 1, wherein the acceleration stand-by period is set to a fixed period regardless of a gear stage of the vehicle.

14. The engine system of claim 13, wherein a boosting range includes a range where spark ignition combustion, or spark controlled compression ignition combustion with an excess air ratio at 1, is performed.

15. The engine system of claim 1, wherein the supercharger is a mechanical supercharger mechanically linked with an engine body.

16. The engine system of claim 15, wherein a boosting range includes a range where spark ignition combustion, or spark controlled compression ignition combustion with an excess air ratio at 1, is performed.

17. The engine system of claim 1, wherein a boosting range includes a range where spark ignition combustion, or spark controlled compression ignition combustion with an excess air ratio at 1, is performed.

18. The engine system of claim 1, wherein a boosting range includes a range where spark ignition combustion, or spark controlled compression ignition combustion with an excess air ratio at 1, is performed, and wherein a non-boosting range includes a range where spark controlled compression ignition combustion with an excess air ratio higher than 1 is performed.

19. The engine system of claim 1, wherein when the operation range of the engine shifts from the first range to the second range while the increase rate in the opening of the accelerator pedal is below the reference increase rate and the electromagnetic clutch is accordingly switched from the disengaged state to the engaged state, and then the operation range shifts to the first range, the controlling module switches the electromagnetic clutch to the disengaged state after the basic stand-by period from the shift to the first range.

20. The engine system of claim 19, wherein when the operation range of the engine shifts from the first range to the second range while the increase rate in the opening of the accelerator pedal is at or above the reference increase rate and the electromagnetic clutch is accordingly switched from the disengaged state to the engaged state, and then the operation range shifts to the first range, the controlling module determines, after the added period from the shift to the first range, to switch the electromagnetic clutch to the disengaged state, and then switches the electromagnetic clutch to the disengaged state after the basic stand-by period from the determination, and the added period is longer than the basic stand-by period.

* * * * *